(12) United States Patent
Humphris

(10) Patent No.: US 9,134,340 B2
(45) Date of Patent: Sep. 15, 2015

(54) METHOD OF INVESTIGATING A SAMPLE SURFACE

(71) Applicant: INFINITESIMA LIMITED, Oxford, Oxforshire (GB)

(72) Inventor: Andrew Humphris, Oxford (GB)

(73) Assignee: INFINITESIMA LIMITED, Oxfordshire (GB)

( * ) Notice: Subject to any disclaimer, the term of this patent is extended or adjusted under 35 U.S.C. 154(b) by 0 days.

(21) Appl. No.: 14/350,055

(22) PCT Filed: Oct. 4, 2012

(86) PCT No.: PCT/GB2012/052462
§ 371 (c)(1),
(2) Date: Apr. 4, 2014

(87) PCT Pub. No.: WO2013/050770
PCT Pub. Date: Apr. 11, 2013

(65) Prior Publication Data
US 2014/0289911 A1 Sep. 25, 2014

(30) Foreign Application Priority Data

Oct. 5, 2011 (GB) .................................. 1117138.6

(51) Int. Cl.
*G01Q 20/00* (2010.01)
*G01Q 30/06* (2010.01)
(Continued)

(52) U.S. Cl.
CPC ................ *G01Q 20/00* (2013.01); *G01Q 30/06* (2013.01); *G01Q 40/00* (2013.01); *B82Y 35/00* (2013.01)

(58) Field of Classification Search
CPC ....... G01Q 10/00; G01Q 10/02; G01Q 10/04; G01Q 20/00; G01Q 20/02; G01Q 20/04; G01Q 40/00; G01Q 40/02

USPC .......................................... 850/1, 5, 6, 19, 20
See application file for complete search history.

(56) References Cited

U.S. PATENT DOCUMENTS 5,741,614 A 4/1998 McCoy et al.
6,489,611 B1 12/2002 Aumond et al.
(Continued)

FOREIGN PATENT DOCUMENTS

JP 2010160161 A 7/2010
WO 02063368 A1 8/2002
WO 2004005844 A2 1/2004

OTHER PUBLICATIONS

Pingali G. S. et al., "Estimation of sample and probe tilts in scanning probe microscopy", Proceedings of the instrumentation and measurement technology conference. Orvine, Ca., May 18-20, 1993; pp. 327-332.
(Continued)

*Primary Examiner* — Michael Logie
*Assistant Examiner* — Jason McCormack
(74) *Attorney, Agent, or Firm* — Lowe Hauptman & Ham, LLP

(57) ABSTRACT

A method of investigating a sample surface. A probe is brought into close proximity with a first sample and scanned across the first sample. A response of the probe to its interaction with the sample is monitored using a detection system and a first data set is collected indicative of said response. The probe and/or sample is tilted through a tilt angle. The probe is scanned across the first sample or across a second sample after the tilting step, and a response of the probe to its interaction with the scanned sample is monitored using a detection system and a second data set is collected indicative of said response. The method includes the additional step of analyzing the first data set prior to tilting the probe and/or sample in order to determine the tilt angle.

12 Claims, 7 Drawing Sheets

(51) Int. Cl.
*G01Q 40/00* (2010.01)
*B82Y 35/00* (2011.01)

(56) References Cited

U.S. PATENT DOCUMENTS

| | | | |
|---|---|---|---|
| 2004/0200261 A1* | 10/2004 | Shuman | 73/1.79 |
| 2005/0012936 A1* | 1/2005 | Murayama et al. | 356/601 |
| 2010/0017920 A1 | 1/2010 | Park et al. | |
| 2010/0170015 A1 | 7/2010 | Park et al. | |

OTHER PUBLICATIONS

Pingali G. S. et al.. "Probe shape recovery in scanning probe microscopy", Dec. 9, 1992, pp. 639-642.
International Search Report mailed Jun. 12, 2012, in International Application No. PCT/GB2012/052462, filed Oct. 4, 2012.
Written Opinion mailed Jun. 12, 2012, in International Application No. PCT/GB2012/052462, filed Oct. 4, 2012.
Search Report mailed Feb. 3, 2012, in Great Britain Application No. 1117138.6.

* cited by examiner

METHOD OF INVESTIGATING A SAMPLE SURFACE

RELATED APPLICATIONS

The present application is a National Phase of International Application Number PCT/GB2012/052462, filed Oct. 4, 2012, and claims priority from Great Britain Application No. 1117138.6, filed Oct. 5, 2011.

This invention relates to the field of scanning probe microscopes and, specifically, to a scanning probe microscope and a method of scanning that employs a novel adjustment mechanism to improve data collection.

The principle behind the scanning probe microscope (SPM) is to obtain a map or image of a sample surface by monitoring the interaction between the sample surface and a probe tip that is positioned in close proximity. By mechanically scanning the tip over the sample surface, data characterising the interaction over an area of interest may be collected and a map or image generated.

A particular example of the SPM is the atomic force microscope (AFM) in which the force interaction between the sample and the sharp tip of a probe is monitored. The probe of a typical AFM includes a small cantilever that is fixed to a support at its base and with the tip at its opposite (free) end. When the probe tip is brought into close proximity with the sample, an interaction force develops between sample and tip. If the tip is in motion, for example oscillating, the interaction force will modify this motion in some way. If the tip is static, the force will displace the tip relative to the sample surface.

During the course of a scan, the strength of the interaction between tip and sample surface will change as the characteristics of the surface beneath the probe tip change. A three axis (xyz) high-resolution scanner typically generates relative motion between the sample and the probe, driving either the sample and/or probe support. The scanner may be a single integrated unit or it may comprise separate actuators or groups of actuators. For example, some AFMs employ a combined x, y direction actuator to move the sample and a separate z actuator to move the probe. Conventionally, the xy plane is taken to correspond generally with that of the sample and the z or vertical direction is taken to be that in which the separation between probe and sample may be adjusted.

Scanners typically employ piezoelectric stack or tube actuators. These actuators are based on applying a voltage to a piezoelectric material to generate movement, which may be guided using mechanical flexures. Alternative scanners, such as those described in WO 02/063368 and WO 2004/005844, utilise the motion of a mechanically resonating structure to generate one or more components of the xy scan.

The effect of the interaction force on either the position and/or motion of the probe tip is monitored during the course of the scan. In conventional AFM operation, the monitored interaction force is held constant. That is, its effect on the probe is observed and a feedback system operates to adjust the separation of the sample and the base of the probe in response to any change so as to return the observed parameter to a predetermined value: the set point of the feedback system. Data associated with this adjustment (conventionally, vertical or "z" movement) is collected and may be used to construct a map or image of the sample across a region of its surface.

AFMs may be designed to operate in a variety of imaging modes. In contact mode the probe continuously remains in close proximity or in contact with the sample. In dynamic (intermittent contact or non-contact) mode the probe is oscillated, bringing it periodically into close proximity or contact with the sample.

If a static tip is used then changes in the interaction force are monitored during the course of a scan via the bending or deflection of the cantilever. As the interaction force between tip and surface changes, the tip moves either towards or away from the surface. This tip movement is communicated to the cantilever part of the probe, which accordingly bends or flexes along its length.

The deflection of the cantilever is typically monitored with an optical lever system. Deflection, in this context, refers to the tilt of an upper surface of the probe, which is used by the AFM to provide an indication of cantilever bend. A light beam is directed towards the upper surface of the probe, above its tip, and reflected towards a position sensitive detector such as a photodiode with two or four segments, as is well known in the art. Many sources may be used to generate the light beam. Typically, a laser diode emitting visible or infrared radiation is used. Alternatively, a He Ne laser, superluminescent diode (SLD), LED or other light source whose emitted beam is capable of being collimated and/or focused to a spot may be used.

Alternatively, the AFM may be operated in dynamic mode. The probe is oscillated, often at or near one of its resonant frequencies, and variations in the sample—probe interaction affect the motion of the probe. In particular, the amplitude, phase and frequency of these oscillations may be monitored and probe—sample separation adjusted in order to maintain constant average interaction.

The use of an oscillating probe means that the probe is only intermittently brought into close proximity or contact with the sample. This has the effect of reducing lateral forces between tip and sample surface. In contact mode lateral forces developed as the probe is moved across the surface may, if imaging soft materials such as biological samples or polymers, destroy the sample surface. Any measurements taken will be rendered meaningless, or at least relate to a deformed surface. These lateral forces may also be destructive of a fragile probe tip. An example of a fragile tip is one with a high aspect ratio i.e. one with a long length relative to its width that is used to probe narrow trenches in sample surfaces. In addition an AFM operating in dynamic mode is often capable of extracting more material-specific information.

The AFM can be configured and used in many different modes. It should be borne in mind that the above description of contact and dynamic modes and of atomic force microscopy is to provide a general introduction to the field of scanning probe microscopy and is not intended to imply any limitation to the field of application of this present invention in any way.

Regardless of their mode of operation, AFMs can be used to obtain images on an atomic scale of a wide variety of samples, insulating and conducting, in a range of environments, air, liquid or vacuum. Typically, they employ piezoelectric actuators, optical lever deflection detectors and very small cantilevers produced using silicon fabrication techniques. Their high resolution and versatility has led to their finding application in diverse fields such as industrial inspection, semiconductor manufacturing, biological research, materials science and nanolithography.

As the field of application of the scanning probe microscope has expanded, so too has the variety of design and mode of operation. There is increasing demand to investigate a wider variety of samples, whose structure may pose additional challenges to a microscope designer.

The probe includes a cantilever beam and tip, which is generally (for AFM) fabricated from silicon or silicon nitride. Typically, the cantilever is around 50-200 µm long, 20-50 µm wide and around 0.2 to 2 µm thick, but this size can of course be varied according to application. The shape may also be varied: typically it is rectangular or triangular with, in the latter case, the tip in the vicinity of its apex. The tip is typically 5 µm at its base, 3-10 µm high and with an end radius of curvature of 10-20 nm. In use, the fine point at the end of the tip is oriented towards the sample. Recently, smaller dimension probes have been fabricated for use at faster imaging speeds. These probes have cantilevers around 5-20 µm long and 3-10 µm wide, with a correspondingly smaller tip. The tip may be formed as part of the cantilever beam fabrication process or added as a post processing step, for example, using electron beam deposition (EBD) to create a diamond like carbon (DLC) spike or attachment of a carbon nanotube. Additionally, the cantilever beam is coated in a metal, typically, gold or aluminum, to increase the reflectivity of the cantilever beam when using an optical detection method.

Scanning probe microscopes require a precise alignment of probe with the microscope system and with the sample. To date, such alignment has been carried out by the three-axis manipulation. As the capability of scanning systems improves and the range of samples to be investigated expands, the tolerance to misalignment of the probe itself is reduced.

There is a perceived need for an alternative method of scanning a sample with a probe that offers a potential improvement to the—data collected. It is therefore an object of the present invention to provide such a method.

Accordingly, a first aspect the present invention provides a method of investigating a sample surface, the method comprising the steps of:
 (a) Bringing a probe into close proximity with a first sample;
 (b) Scanning the probe across the first sample;
 (c) Monitoring a response of the probe to its interaction with the sample using a detection system and collecting a first data set indicative of said response;
 (d) Tilting the probe through a tilt angle with respect to the first sample;
 (e) Scanning the tilted probe across the first sample or across a second sample; and
 (f) Monitoring a response of the tilted probe to its interaction with the scanned sample using a detection system and collecting a second data set indicative of said response.

The method includes the additional step of analysing the first data set prior to tilting the probe in order to determine the tilt angle.

For example the first data set can analysed for errors, artifacts or missing information (for instance a trench area not accessed by the tip) that may arise through probe misalignment. Through the nature and severity of such artifacts, the degree of re-alignment required to return the probe to its ideal (vertical) orientation may be deduced. This re-alignment may therefore be converted to a tilt angle, through which to orient the probe.

In the above example the first data set is analysed prior to tilting the probe in order to determine both the magnitude and direction of the tilt angle. In an alternative example the first data set may be analysed prior to tilting the probe in order to determine only the direction of the tilt angle. For example the probe can be adjusted by a preset amount so as to reduce asymmetry and a further image collected. This process can be repeated until the features within the image that are expected to be symmetric appear so in the image.

The method of the first aspect of the invention enables collection of two data sets, which differ in the tilt orientation of the probe as it is scanned. Enabling the probe to tilt offers a more flexible adjustment mechanism than in the prior art. This adjustment mechanism forms the basis of a method of collecting data relating to the interaction between the probe and sample that may be used in multiple applications. The technique offers numerous possibilities to make use of the two data sets to improve the information provided by the microscope.

Tilting of the probe, refers to an adjustment of the vertical orientation of the probe with respect to the sample surface. In an idealised situation, the probe axis will be aligned with the normal to the sample surface. Any imparted tilt will pivot it away from this alignment. Such movement may be achieved using a tilt stage: a platform that presents a support surface or surfaces on which one or more objects are to be mounted. The platform is connected to an adjustment mechanism that enables a "tilting" motion about at least one axis, the axis typically being generally parallel to the surface or to one of the surfaces. This enables the orientation of the surface or surfaces with respect to an external plane (in this instance, that of the sample) to be adjusted.

In accordance with the method of this invention, probe orientation can be adjusted at or near to its scanning position within the microscope. This offers an additional degree of flexibility to a prior art alignment system.

One application is to use the re-orientation offered by this system to improve alignment between probe and sample. This allows the probe to be oriented so as to compensate for an intrinsic misalignment of the tip with respect to the cantilever. Such errors may arise during one of the many stages of the fabrication process, for example coating or adding an attachment such as a carbon nanotube to the cantilever; or through a procedure that stresses the cantilever, for example mounting it on a carrier or microscope, locating it in an environment that is subject to temperature changes, etc.

Ideally the step of analysing the first data set comprises the steps of:
 (a) Searching the first data set and identifying asymmetric features therein; and
 (b) Determining the degree of asymmetry in the asymmetric features in order to provide an estimate of the tilt angle.

Once the probe has been re-aligned it is of course anticipated that data collected with a probe in this position will be more accurate. Accordingly, a map of the sample surface is preferably generated using the second data set.

The first sample scanned in the above method may be a calibration sample or specimen. That is, a sample with known features may be used to collect data from which to determine the tilt angle. Typical structures may be a grid structure of grooves or a sample with a regular arrangements of pits, but others examples may serve equally well. All that is required is that the structure of features on the calibration sample is known and therefore is expected to generate a particular form of image. The departure of the actual image from this predicted image provides an indication of the misalignment of the probe. In fact, the calibration sample does not, strictly, need symmetric features, although analysis of the data set is made easier if it has. Once the misalignment is determined using the calibration sample, and probe re-aligned, the sample to be investigated may then be scanned.

Clearly, the use of a calibration sample is limited to situations in which one sample can readily be replaced by another on the stage of the scanning probe microscope in accurate alignment. Such easy access to a calibration sample is typically provided with instruments designed for use with large samples and in production environments, such as in the semiconductor industry in which the calibration samples can be placed beside the sample to be investigated and an automated stage used to quickly swap between them.

In other situations, the same sample may be used for both scans, which avoids replacement on the microscope stage. Some knowledge of the sample structure should be available however to enable identification of features from which the tilt angle can be determined.

This process of probe alignment may need to repeat cycles in order to achieve sufficient accuracy. In such situations therefore, the method may include the additional steps of:

(a) Analysing the second data set by searching for asymmetric features and, if present, determining a second tilt angle in accordance with the degree of asymmetry;
(b) Tilting the probe through the second tilt angle with respect to the sample;
(c) Optionally changing the sample to a third sample;
(d) Scanning the further-tilted probe across the first, second or a third sample; and
(e) Monitoring a response of the further-tilted probe to its interaction with the sample using a detection system and collecting a third data set indicative of said response.

With this process, of course, the more accurate map of the sample surface is generated using the third data set. Again, a calibration sample may be used for the first two scans, with the final scan, once the probe is aligned, being carried out on the actual sample to be investigated. Alternatively, if appropriate, two different calibration samples may be used to provide complementary misalignment information. For example, misalignment in two different directions. Or the sample itself may be used for all scans.

Alternatively, the additional flexibility offered by the method of this invention may be used to carry out a second scan of the sample that collects data complementary to that collected in the first. For example the method may involve the probe being oriented at a first angle with respect to the sample as it first scans the sample and at a complementary angle as it carries out the second scan. The two scans cover at least partly coincident areas of the sample such that the first and second data sets can be combined to enable generation of a third data set relevant to the coincident area.

A tilted probe may be able to access features on a sample surface that are not so readily investigated by a probe in a more vertical orientation. By scanning the probe as it is held at different tilt angles, different features of the surface may be revealed and investigated. Reference to "complementary angle" as used above is therefore to be understood to be an angle at which the probe may be oriented to collect data that has not been collected by the probe at its first angle. Combining data collected at the two (or more) tilt angles enables more complete data collected over all features of the surface.

Preferably the second angle has the same magnitude as the first angle in an opposite direction. This arrangement enables better investigation of symmetric features, which may be too narrow, deep or high to be susceptible to tracking over the extent of the feature by a single probe. Combining the two collected data sets into a third may further permit a more accurate interpretation of surface features than possible with a single first or second data set.

It will be appreciated that the step of tilting or further tilting the probe may result in the back of the probe moving out of alignment with the detection system of the microscope. Accordingly, the method preferably includes the additional step of aligning the probe with the detection system. One way in which this may be achieved is to calculate, from the size of probe and angle of tilt, the displacement (in x and y directions) of the back of the probe and to reposition the probe accordingly.

The step of tilting or further tilting the probe may comprise driving an actuator to apply a force to one side of a platform such that the platform pivots about a pivot point, the orientation of the platform being linked to that of the probe.

In the preferred embodiments of the first aspect of the invention described below, the relative angle between the orientation between the probe and the sample is adjusted by tilting the probe with the sample remaining stationary during the tilting of the probe. However the relative angle between the probe and the sample may also be adjusted by tilting the sample and the probe in opposite directions.

A further aspect of the invention provides a method of investigating a sample surface, the method comprising the steps of:

(a) Bringing a probe into close proximity with a sample;
(b) Scanning the probe across the sample;
(c) Monitoring a response of the probe to its interaction with the sample using a detection system and collecting a first data set indicative of said response;
(d) Tilting the sample through a tilt angle with respect to the probe;
(e) Scanning the probe across the tilted sample; and
(f) Monitoring a response of the probe to its interaction with the tilted sample using a detection system and collecting a second data set indicative of said response, wherein the method includes the additional step of analysing the first data set prior to tilting the sample in order to determine the tilt angle.

The relative angle between the orientation between the probe and the sample may be adjusted by tilting the sample with the probe remaining stationary during the tilting of the sample. However the relative angle between the probe and the sample may also be adjusted by tilting the sample and the probe in opposite directions.

A further aspect of the invention provides a method of investigating a sample surface with a probe which is supported by a carrier, the method comprising the steps of:

(a) Bringing the probe into close proximity with a first sample;
(b) Operating a scanner (such as one or more piezoelectric actuators) to scan the probe across the first sample by driving the carrier with the scanner;
(c) Monitoring a response of the probe to its interaction with the sample using a detection system and collecting a first data set indicative of said response;
(d) Tilting the probe through a tilt angle with respect to the first sample by tilting the carrier and the scanner about a tilt axis;
(e) Scanning the tilted probe across the first sample or across a second sample; and
(f) Monitoring a response of the tilted probe to its interaction with the scanned sample using a detection system and collecting a second data set indicative of said response.

A further aspect of the invention provides a scanning probe microscope comprising a probe; a carrier which supports the probe; a scanner (such as one or more piezoelectric actuators) which is operable to drive the carrier in one or more dimensions; and a tilt stage which is operable to tilt the carrier and the scanner.

Typically the scanner is operable to drive the carrier in two or more dimensions.

The scanner typically comprises one or more actuators, each actuator operable to drive the carrier in one dimension.

Typically the scanner is positioned between the tilt stage and the carrier.

Preferably the scanner is mounted on the carrier and the tilt stage is mounted on the scanner. In a preferred embodiment the scanner is positioned above the carrier and the tilt stage is positioned above the scanner. However this arrangement may be inverted in an alternative embodiment in which the carrier is positioned above the scanner and the scanner is positioned above the tilt stage.

The scanner is typically operable to drive the carrier without driving the tilt stage.

The methods described above may be used with many different types of probe but one in which it is likely to be particularly applicable to improving the accuracy of data collection is a high aspect ratio probe. Such a probe has a high ratio of length to width, enabling it to extend deeper into trenches. The ratio of length to width may be greater than 1, greater than 3, greater than 5 or greater than 10 for example. The shape of the probe may be conical, cylindrical or even re-entrant where the end a region of a tip of the probe close to the surface has a greater width than regions of the probe further away from the sample.

The carrier preferably comprises a cantilever with a longitudinal cantilever axis, the probe being mounted towards a distal end of the cantilever.

The tilt stage is typically operable to tilt the carrier and the scanner about a tilt axis which is not perpendicular to the cantilever axis. Typically the tilt axis is parallel with a projection of the cantilever axis in the plane of the sample.

In an alternative aspect, the present invention provides a scanning probe microscope that is operated in accordance with the above-described methods. The microscope may be any scanning probe microscope, including an atomic force microscope.

In the above methods a response of the probe to its interaction with the sample is monitored using a detection system. This detection system may comprise for example an optical detector such as an optical lever or interferometer which monitors deflection or height of the probe. Alternatively the detection system may measure a force interaction between the probe and the sample.

In a preferred embodiment the scanner is operated to maintain the output of the detection system at a constant level, and the scanner drive signal is used to collect the data set(s).

Preferably each data set is indicative of a topography of the sample surface.

Embodiments of the invention will now be described by way of example only and with reference to the accompanying drawings.

Figure 2A:
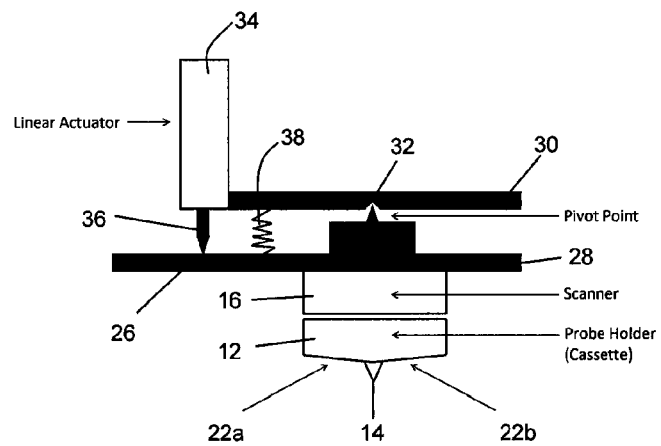
Figure 2B:
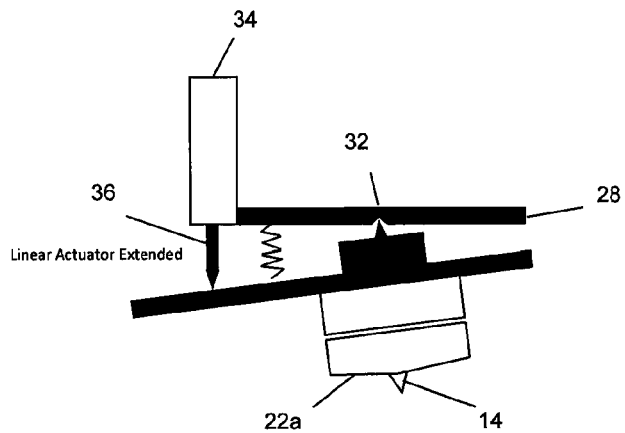
Figure 2C:
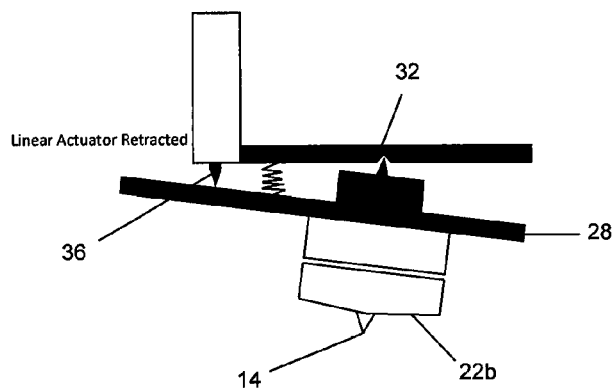

FIGS. 2(a), 2(b) and 2(c) illustrate schematically an embodiment of a tilt stage for use with the probe mounting system of the present invention, the tilt stage being shown with respectively no (2(a)), anticlockwise (2(b)) and clockwise (2(c)) tilts of the probes.

Figure 3A:
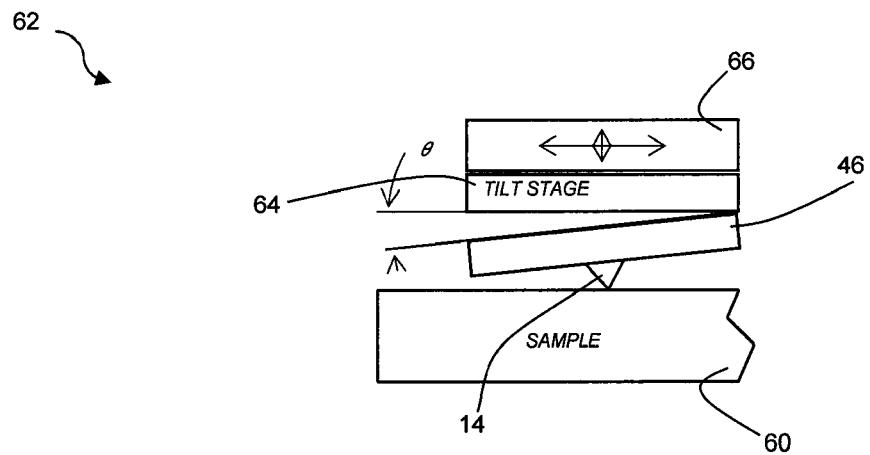

FIG. 3(a) illustrates a second embodiment of a probe mounting system and scanning mechanism for use in scanning probe microscopy.

Figure 3B:
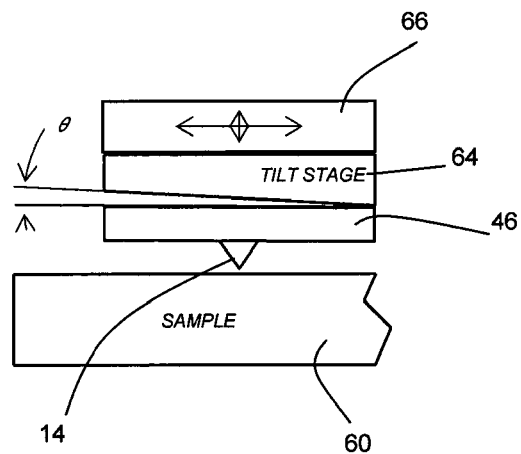

FIG. 3(b) illustrates the probe assembly of FIG. 3(a) following compensation for misalignment of the probe.

Figure 4A:
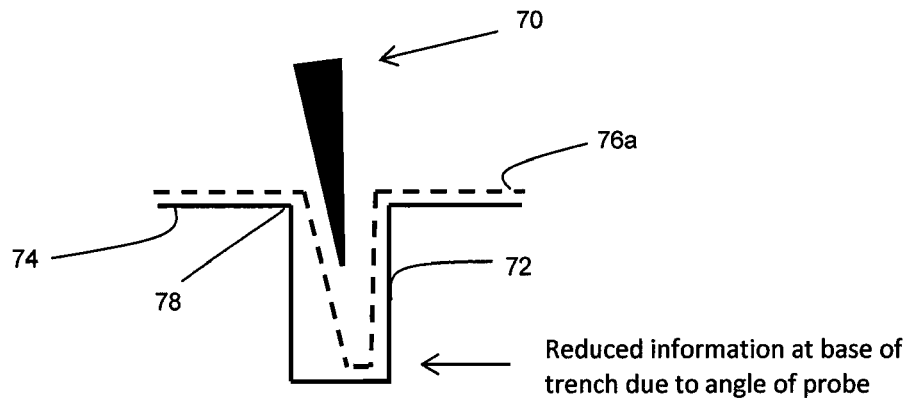
Figure 4B:
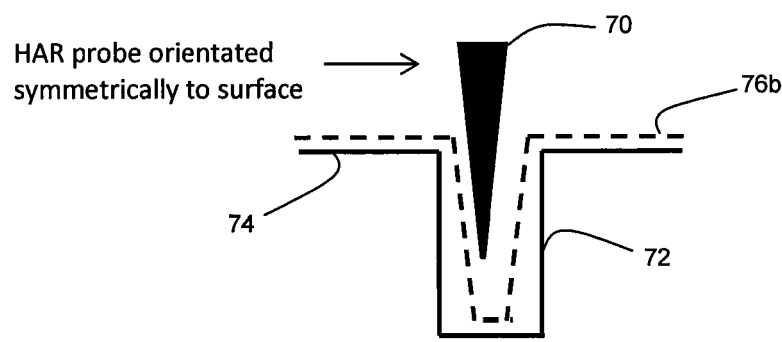

FIG. 4 illustrates schematically a high aspect ratio probe as it scans a narrow trench. In FIG. 4(a) the probe is shown misaligned; in FIG. 4(b) the situation is shown after realignment in accordance with the method of this invention.

Figure 5:
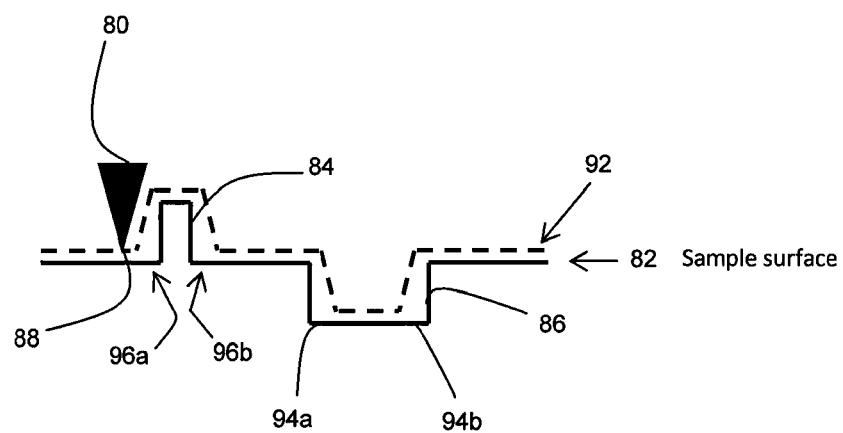

FIG. 5 illustrates schematically how a probe scanning a sample surface may be prevented from scanning near abrupt changes in surface topography.

Figure 6A:
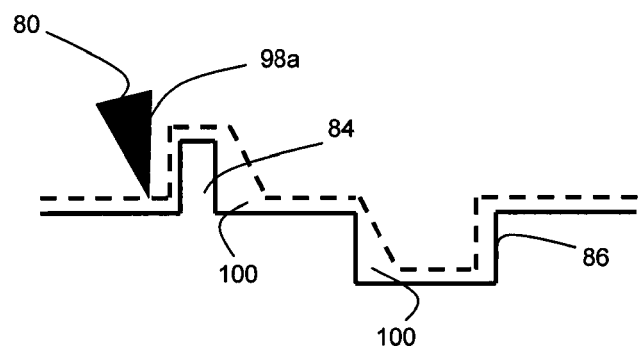
Figure 6B:
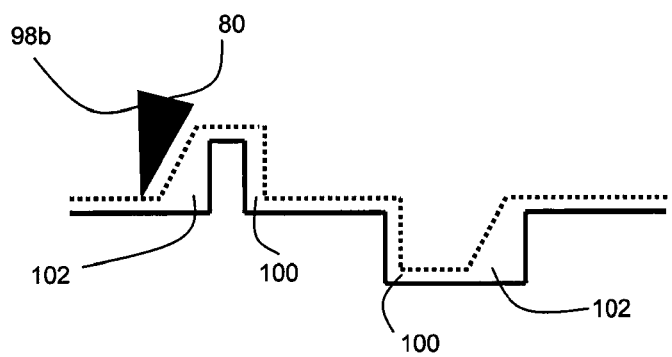
Figure 6C:
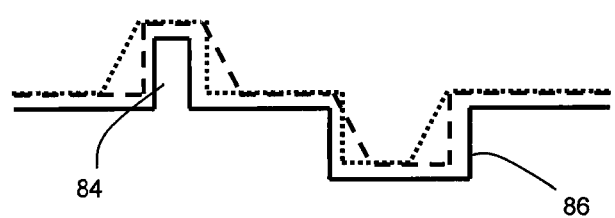

FIGS. 6(a), 6(b) and 6(c) illustrate schematically how a probe in two different tilt orientations may be used to obtain more complete information concerning the structure of a sample surface.

Figure 1A:
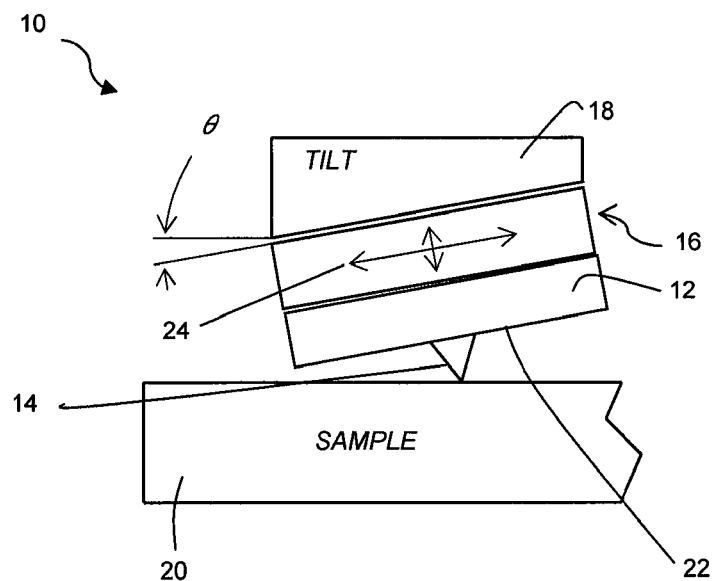
FIG. 1(a) illustrates a first embodiment of a probe mounting system and scanning mechanism for use in scanning probe microscopy in accordance with this invention.
Figure 1B:
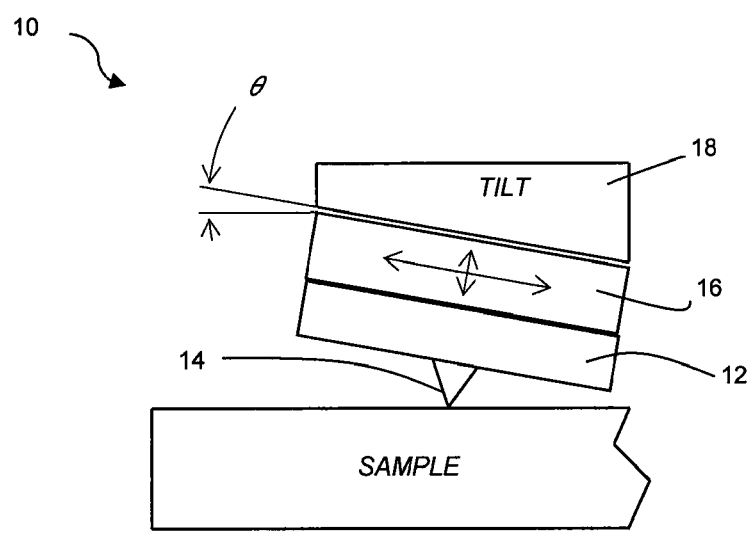
FIG. 1(b) shows the embodiment of FIG. 1(a) with the probe in an alternative configuration.
Figure 1C:
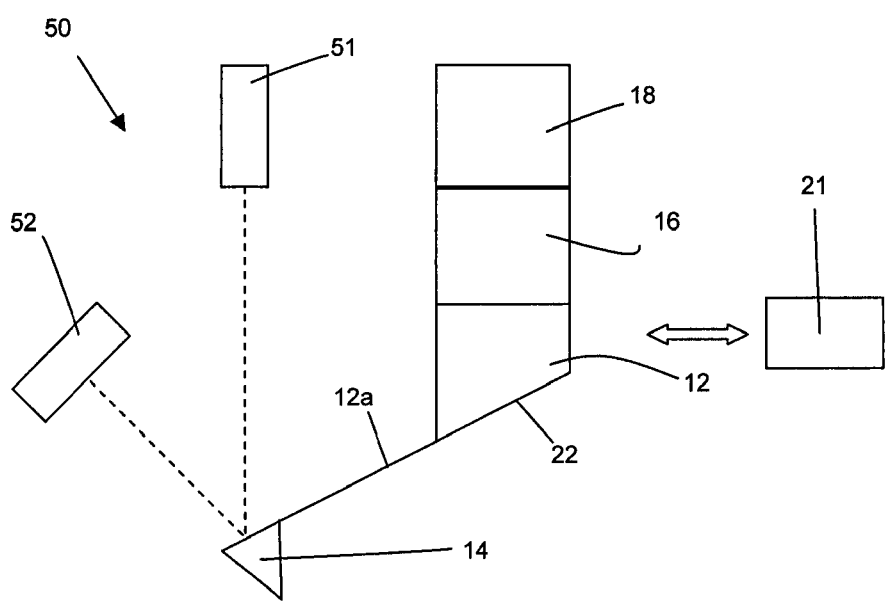
FIG. 1(c) is a side view of the probe mounting system shown in FIGS. 1(a) and 1(b).

With reference to FIGS. 1(a), 1(b) and 1(c) there is shown a probe assembly 10. The assembly 10 comprises a carrier 12, 12a, which supports a probe 14, a scanner 16 mounted on the carrier 12, 12a and a tilt stage 18 mounted on the scanner 16. The scanner 16 is operable to drive the carrier 12, 12a in three dimensions and so facilitates a scan of a sample 20 when the probe assembly 12 is incorporated in a microscope.

The carrier 12, 12a comprises a cantilever 12a with a longitudinal cantilever axis, the probe 14 being mounted towards a distal end of the cantilever as shown in FIG. 1(c.)

The scanner 16 may be a single integrated unit or it may comprise separate actuators or groups of actuators. For example the scanner 16 may comprise a combined x, y direction actuator to move the carrier 12, 12a parallel with the surface of the sample 20 and a separate z actuator to move the carrier towards and away from the sample 20. The scanner 16 typically comprises a piezoelectric actuator which is operated by applying a voltage to a piezoelectric material to generate movement, which may be guided using mechanical flexures. Alternatively the scanner 16, may utilise the motion of a mechanically resonating structure to generate one or more components of the xy scan as described in WO 02/063368 and WO 2004/005844.

The carrier 12, 12a has a lower face that is shown flat in FIGS. 1a and 1b (so the cantilever and lower face is not visible in these Figures) but may be angled as shown at 22 in FIG. 1c so the cantilever axis extends downwardly away from the carrier 12, 12a at an acute angle towards the sample, thus preventing the carrier 12, 12a from interfering with the sample. The tilt stage 18 is operable to tilt the carrier 12, 12a and scanner 16 about a tilt axis running longitudinally to the cantilever 12a but substantially in the plane of the sample (in other words the tilt axis is parallel with a projection of the cantilever axis in the plane of the sample).

In preparation for a scan, the carrier 12, 12a is tilted using the tilt stage 18 to adjust the orientation of the probe relative to the sample 20. The stage 18 has a range of movement that enables the probe to be aligned symmetrically with respect to the sample surface (not shown), with a leftwards or anticlockwise tilt (FIG. 1(a)) of angle θ or a rightwards or clockwise tilt of θ (FIG. 1(b)). Of course, the left and right tilt need not be equal; that depends on the application. Even in the central symmetric position, the lower face 22 need not be parallel to the sample 20. In fact the carrier will likely be mounted at an angle that will depend on the specific cantilever application and also on the design and alignment of the detection system of the microscope in which it is used. This can be seen in the side-view of the assembly shown in FIG. 1(c). It should be noted that the angles shown in these Figures are exaggerated for clarity.

The maximum tilt angle provided by the tilt stage 18 may be +/−3 degrees, +/−10 degrees or more preferably +/−20 degrees.

Once the probe 14 has been tilted to its desired orientation, the microscope detection system is aligned with the probe 14 brought into proximity with the sample 20. An example of a suitable microscope detection system 50 is shown in FIG. 1(c). The system comprises an optical lever with a laser 51 which emits a laser beam which is reflected off the distal end of the cantilever 12a near the probe 14 onto a split photodiode 52. The output of the split photodiode gives an indication of the angle of deflection of the cantilever. The scanner 16 is then operated to drive the probe 14 across the plane of the sample (x, y scan, in conventional terminology) and data is collected with which to construct the map or image of the sample.

In describing this invention reference will be made to a conventional orientation of Cartesian axes. The z direction is perpendicular to the plane of the sample 20 and therefore corresponds to the direction of vertical adjustment in order to maintain feedback. The probe is scanned in the x, y plane, the y direction being that corresponding to the projection of the cantilever arm 12a in the plane of the sample.

Once the scan with the probe in its first position is complete, the tilt stage 18 is driven to orient the probe 14 in its second position (FIG. 1(b)). This position may be complementary to the first, as shown in these figures. Alternatively, the probe may be adjusted subsequent to the first scan to compensate for a previously undetected misalignment. These, and other applications, will be described in more detail below. At present, it suffices to know that, for whatever reason, a second scan may be carried out with the probe having undergone a tilting adjustment from its position in the first scan. Once the probe is aligned in its second position, a second scan is performed.

The tilt stage 18 is driven to rotate the carrier about a tilt axis that runs longitudinally with the probe. This tilt axis, when projected onto the sample surface, runs substantially parallel to the y-axis. Alternatively, the tilt axis may run parallel to the y-axis, or indeed adopt a convenient orientation inbetween, depending on the construction of tilt stage and carrier.

It can be seen from the Figures that the back of the probe has moved between the two orientations, the degree of movement being such that it may be taken out of alignment with the microscope and hence of the detection system 50. From the degree of tilt and height of the probe, this displacement may be calculated. With the probe in the orientation set out above, a tilt about an axis parallel to the y axis will result in a displacement of the back of the probe in the x direction. The displacement is then calculated and the scanner 16 driven to move the probe laterally in the x direction in order to compensate. This compensation procedure is automated.

It can be seen that this invention differs from the prior art by incorporation of the tilt stage 18 in the probe assembly in order to facilitate probe adjustment. The tilt stage enables only a minimal adjustment to be used to change the alignment of the probe as it is brought into a scanning position. This small range of movement permits a relatively quick adjustment that is less susceptible to mechanical errors than other mechanisms for adjusting probe position.

In describing operation of a SPM reference has been made above to a probe being brought into "close proximity" with a sample. This refers to a region in the vicinity of the sample at which the interaction to be monitored by the particular mode of SPM operation employed is established. The term may therefore refer to a different separation distance, depending on the particular mode of SPM operation. Similarly a "scan" has been referred to a conventional lateral movement across an xy plane. It may however follow a different pattern and use of the term is intended only to refer to a series of measurements being taken of the interaction between probe and sample. That is, neither term is to be considered restrictive.

The tilt stage 18 may be constructed in a number of known ways and an example of one is shown in FIG. 2. The lower surface 22 of the carrier in this embodiment is shown as having first 22a and second 22b lower faces, which are angled to avoid interfering with the sample. This helps with initial alignment of the probe 14, which is located at their intersection. In FIG. 2(a) the tilt stage 18 is shown in its untilted configuration mounted on the scanner 16 and carrier 12, 12a, as for FIG. 1. The probe 14 is aligned substantially vertically with respect to the sample. The tilt stage 18 comprises a tilt surface 26, which is formed from a lower surface of a cantilever platform 28. The cantilever 28 is moveable with respect to an upper support 30 about a pivot point 32. A linear actuator 34 with driving arm 36 and spring 38 connect the cantilever 28 with the upper support 30. The spring 38 generally provides an upwards force, which will hold the cantilever platform 28 in contact with the drive of the actuator arm 36 as it is lowered and raised.

FIG. 2(a) shows the tilt stage 18 in its level orientation. The actuator arm 36 is extended such that the cantilever platform 28 is aligned substantially parallel with the sample surface (not shown): the probe 14 and intersection between carrier lower surfaces 22a, 22b point downwards. In this position, the spring 38 is in extension and so provides an upwards force, maintaining contact between the cantilever platform 28 and the actuator drive 36.

As the actuator arm 36 is extended, it acts to push the left-hand side (in FIG. 2) of the cantilever platform 28 towards the sample surface (downwards). The cantilever platform 28 thereby pivots about the pivot point 32, tilting the stage. At the actuator position shown in FIG. 2(b), the stage has tilted the carrier 12, 12a to the extent that surface 22a is oriented roughly parallel with the sample surface and the probe 14 is tilted leftwards.

As the actuator arm 36 retracts, the spring 38 acts to maintain contact with the cantilever 28, and the stage is tilted about the pivot point 32 in an opposite direction. At the position shown in FIG. 2(c), the carrier 12, 12a is now oriented such that surface 22b is oriented roughly parallel with the sample surface and the probe 14 is tilted rightwards.

A preferred embodiment of tilt mechanism is a flexure hinge, which tends to be more mechanically stable than other hinge systems. Alternatively a kinematic mount, which may be adjusted with a high degree of accuracy, may be used. This latter system is based on an arrangement of three points of contact between tilt surface 26 and upper support 30: a point contact, groove and flat contact.

In the embodiment of the invention shown in FIG. 1, the scanner 16 is below the tilt stage 18 and supports only the carrier 12, 12a. An alternative configuration is possible in which the scanner 16 drives both the carrier 12, 12a and tilt stage 18. The FIG. 1 configuration is however advantageous in that the scanner 16 drives a lower mass: that of the carrier 12, 12a only. The ability of the scanner to move the probe along a well-defined trajectory is directly related to the quality of image produced by the microscope. To optimise the operation of the scanner, it is preferable to minimise the mass of the components being driven by the scanning system. A particular advantage of minimising the mass is to increase the mechanical resonant frequency of the system which enables higher operating (scanning) speeds and reduces coupling of the system to mechanical environmental noise.

There is a complication inherent however in adopting the lower-mass arrangement of FIG. 1. It can be seen that once a probe has been selected, two drive directions of the scanner 16, those indicated by arrows 24 in FIG. 1, are no longer aligned parallel and perpendicular to the sample surface. Specifically, if the scanner 16 has three orthogonal drive directions which are aligned with the XYZ axes of the sample, then as the scanner 16 is tilted at least two of these scanner directions will become tilted relative to the XYZ axes of the sample. In the case where the tilt axis is parallel with the Y axis then only the X and Z drive directions of the scanner (indicated by arrows 24 in FIG. 1) will become tilted, but if the tilt axis is not parallel with the Y axis then all three drive directions of the scanner will become tilted.

In performing a scan, the scanner 16 is controlled by x, y and z control signals which each drives a respective one of the orthogonal scanner drive directions and together cause the scanner 16 to move the probe across the surface in a raster pattern. If the scanner 16 is tilted relative to the sample then the raster scanning pattern will also be tilted relative to the sample. In such a case the z control signal of the scanner will be indicative of the topography of the sample in the frame of reference of the scanner. If two image sets collected with the scanner and probe at different tilt angles are merged, then an appropriate correction can be made in software.

Alternatively the drive signals into the scanner can be corrected as follows, so that the raster scanning pattern remains in a plane parallel with the XY plane of the sample for all tilt angles. The x, y position of the probe is deduced from the position of the scanner 16. This x, y position of the scanner is measured by an XY scan sensing system. For instance the scan sensing system may comprise an interferometer scan sensor shown schematically at 21 in FIG. 1(c) which reflects a radiation beam aligned with the Y axis of the sample off the scanner 16 or the carrier 12 and uses interferometry to measure the y position of the scanner/carrier. A similar interferometer (not shown) aligned with the X axis of the sample can be used to measure the X position of the scanner 16 and carrier 12, 12a. Alternatively the scan sensing system may be a set of LVDT detectors, capacitance detectors or strain gauges. If the orientation of the scanner is tilted then the x position of the scanner 16, relative to the frame of reference of the scanner sensor, is used to correct the x control signal driving the scanner. For this tilt alignment: $X = x \cos \phi$, where $\phi$ is the angle away from the horizontal through which the tilt stage 18 is moved, x is the original scan size control signal and X its corrected value. A similar correction is applied if necessary to the y and/or z scanner control signals.

Each time the tilt stage 18 is adjusted a recalibration procedure will need to be carried out. In addition, movement in the scanner z direction is typically used to extract information relating to the height of the sample. The scanner z movement will therefore no longer correspond to a direction perpendicular to the sample surface, which in turn means it loses its correspondence with sample height. A correction to the scanner drive signals may optionally be applied to allow for the angular adjustment.

The scanner 16 is operated to maintain the output of the optical lever detection system 50 at a constant level, and the Z scanner drive signal (corrected if required as mentioned above) is used to collect the data sets relating to the topography of the sample.

It should be noted that although, for clarity, the example of the tilt axis presented above is taken as the y axis of the scanning system, this alignment is not necessary. The tilt axis could be any direction such that a selected probe may be brought into alignment with the sample surface. Clearly though, in the more general case, all three components (x, y and z) used to define positions of the probe will have to be recalibrated as a result of the tilt.

Similarly, although the embodiments described herein do not explicitly relate to an oscillating probe, this invention is to be understood to nonetheless apply equally to such dynamic modes of operation. It is to be noted however that, as the probe is tilted, the plane of oscillation will also tilt.

A second embodiment of a probe mounting system 62 in accordance with this invention is shown in FIG. 3. In accordance with this embodiment of the invention, the probe assembly 62 includes a tilt stage 64 mounted on a carrier 46 and a scanner 66 that drives the tilt stage 64 as it supports the carrier 46. The tilt stage is operable to tilt the carrier 46 in a direction along a line (x direction) that pivots the probe 14 about its tip. The scanner 66 is operable to drive the carrier 46 plus tilt stage 64 in three dimensions and so facilitates a scan of a sample 60 when the probe assembly 62 is incorporated in a microscope.

As with the previous embodiment, the tilt stage 64 may be constructed in a number of known ways. Preferably, it is based on the flexure hinge mechanism referenced previously. What is important is that the stage 64 is able to tilt the probe though an angle and so to set it in a particular orientation with the sample surface. FIG. 3a shows the arrangement of carrier 46, tilt stage 64 and scanner 66 prior to adjustment. As can be seen, the probe 14 is tilted at an angle θ to the normal to the sample surface. This tilt may arise during fabrication of the probe. Probes for SPM applications are becoming smaller, reducing their tolerance to fabrication errors. Accordingly the probe may not be aligned symmetrically with respect to its carrier. In consequence, the probe may not then be aligned vertically with respect to the sample surface once the carrier is mounted in a microscope. The tilt stage 64 may be used to compensate for this misalignment. A tilt-adjusted arrangement is shown in FIG. 5b. The tilt stage 64 has been driven to tilt the carrier 46 through a compensatory angle θ, in the opposite direction to the misalignment, in order to present a near-vertical probe. Once in this compensated position, the scanner 66 is operated as in the prior art to move the probe 14 in an x, y scan across the surface of a sample. Feedback control is provided by adjustment in the z direction.

For accurate measurements, it is important to determine accurately the degree of tilt adjustment θ required to align the probe. This may be done in a number of ways. For example, in preparation for a scan, the microscope detection system is aligned with the probe 14. The back of the probe 14 is illuminated by the beam of the detection system and reflected back to the collection optics. The probe 14 position is adjusted in x and y and also by adjusting the angle of the carrier 46 using the tilt stage 64. Once the back of the probe 14 is at the correct angle, the reflected beam will be directed back to the detection system and the tilt stage 64 will have positioned the probe 14 substantially vertically with respect to the sample 60. The probe 14 is then brought into proximity with the sample 30 and the scanner 66 is operated to drive the probe 14 across the plane of the sample (x, y scan, in conventional terminology). Data is collected with which to construct the image.

Tilting of the probe is described above as being nominally about the y axis. This is to simplify the description. Clearly the tilt stage could be aligned to tilt about any direction relative to the sample. In addition one or two tilt axes may be provided. In some applications, for example if the microscope is investigating linear features on a sample, only one tilt axis will be necessary, as misalignment will only be significant as the probe is scanned across the linear feature. In the more general case, for example where holes or irregular-shaped features are investigated, then it will be necessary to provide two tilt axes. This may be implemented by one or two tilt stages.

Probes may be designed with different geometries for imaging specific types of structure: probes with re-entrant shaped tips specifically for use in 3D imaging of undercut structure; probes having different aspect ratios, higher aspect ratios being better adapted for imaging inside structures such as holes and trenches; probes having differing sharpness, sharper tips providing improved resolution. In many instances alignment of probe geometry with the sample is also critical. By allowing an extra degree of freedom to probe adjustment, this invention can be applied to a number of novel scanning methods.

A first method of carrying out a scan of a sample using a probe mounted using a tilt stage in accordance with this invention is described with reference to FIGS. 4 and 5. A method of determining tilt of a probe to bring it into alignment that uses microscope optics was described above. For accurate work however, it is not possible to align the probe optically with sufficient accuracy. For the smallest probes, and for those with large aspect ratios, even the smallest misalignment may be critical to accurate data collection. A more accurate method of correcting for misalignment of a high aspect ration probe is described.

FIGS. 4(*a*) and 4(*b*) illustrate a high aspect ratio probe 70 as it scans a feature 72 of a sample surface 74. The feature 72 is a trench within the sample. This feature 72, as can be seen in the figure, is sufficiently narrow and deep that even the high aspect ratio probe 70 is physically prevented from following the surface within the trench. The path 76*a*, 76*b*, defined by the level of constant interaction, that is followed by the probe is indicated in the figures by dashed lines.

FIG. 4(*a*) shows the probe 70 in its default orientation as it is mounted on a microscope. As can be seen, the probe 70 is misaligned with respect to the surface 70 and so does not extend vertically above the sample. Such a misalignment error may be introduced during fabrication or in mounting the probe on the microscope. As the scan progresses the probe 70 traces the surface until it reaches a lip 78 of the trench. At this point, the probe 70 is prevented from extending fully into the trench as the side of the probe that is tilted towards the sample impinges against the lip 78. The probe effectively "slides" down the lip 78, following a diagonal rather than vertical path. At the opposite edge of the trench, the tilt of the probe is such that it is oriented away from the edge. The tip accordingly remains in contact with the trench along this side until the feature has been scanned. The result is that reduced information is gathered at the base of the trench: that from one side is lacking. Moreover, the path 76*a* followed by the probe 70 tip is asymmetric. This asymmetry will be reflected in the reconstructed map of the sample.

In accordance with one aspect of this invention, a method of aligning a probe is as follows. First a scan is carried out of a sample with the probe in its nominally "untilted" position. A number of sample features, such as the exemplary trench 72 are symmetrical and accordingly are expected to be imaged as such. Therefore, after the first scan is complete, the map of the sample obtained with the probe in this orientation is analysed. The appearance of multiple features with a common level of asymmetry would indicate that the probe is misaligned. The degree of misalignment can be calculated from the asymmetry of the imaged feature. A compensatory tilt can be applied to the tilt stage so as to align the probe vertically. Alternatively the probe can be adjusted by a preset amount, in a direction determined by the analysis of the map from the first scan, so as to reduce the asymmetry and a further image collected. This process can be repeated until the features within the image that are expected to be symmetric appear so in the image.

Two image processing packages which can be used to generate and analyse the map of the sample are SPIP from Image Metrology A/S (see http://www.imagemet.com) and Gwyddion which is Free and Open Source software (see http://gwyddion.net).

The asymmetry of an imaged feature may be determined by line profile analysis—that is, by extracting a line of data from the image and analysing that line of data. This line of data can be along the scan direction of the probe or an arbitrary direction, and the line data could be an average of multiple lines or interpolated to reduce noise. An example of how SPIP can be used to extract a line of data and analyse that line of data can be found at:

http://www.imagemet.com/WebHelp6/
  Default.htm#Zcalibration/Width_and_Slope_Measurements.htm.

Alternatively the asymmetry of an imaged feature may be determined by tip shape characterisation, as described for example at:

http://www.imagemet.com/
  index.php?main=products&sub=examples&id=47; or
http://gwyddion.net/documentation/user-guide-en/tip-
  convolution-artefacts.html FIG. 4(*b*) shows the probe 70 scanning the same surface feature 72 when it is correctly aligned. As can be see, a symmetrical path 76*b* is traced by the tip. The symmetry of this path is reflected in the image and the probe is then known to be correctly aligned.

In order to speed up the alignment process, a scan of only a section of the sample is usually sufficient to align the probe. A scan can then be taken of the entire sample, with the probe in its correct orientation. Alternatively, the alignment process is carried out while scanning a calibration specimen. The calibration specimen will have a known arrangement of features that are expected to give rise to characteristic signals in the data. The departure of the observed signals from those that are anticipated may be used to deduce the misalignment of the probe. Preferably the calibration specimen has high aspect ratio features (such as trenches or peaks) with a higher aspect ratio (length/width) than the probe 14.

As well as assisting in aligning the probe, the method of the present invention can also be used to improve scan coverage of certain sample types. This is achieved by using the tilt stage to adjust the angle of the probe tip with respect to a sample feature. An example is shown in FIGS. 5 and 6.

An inaccuracy in standard scan techniques is illustrates in FIG. 5. In this Figure, there is shown a situation in which a high aspect-ratio probe 80, in a symmetrical orientation, is used to scan a sample 82 whose surface includes features such as a high step 84 and deep trench 86. In a conventional scanning arrangement a probe tip 88 cannot physically trace a vertical or steep drop as an upper lip 90 of the trench acts on an upper part of the probe to force the tip outwards. The tip accordingly follows a path shown by dashed line 92 that leaves two extreme regions 94*a*, 94*b* at the base of the trench unscanned. A similar situation pertains to the step 84. The upper lip of the step forces an edge of the probe upwards before the tip contacts its surface. Again two extreme regions 96*a*, 96*b* in the vicinity of the step remain unscanned.

FIG. 6*a* shows the same probe 80 and surface features 84, 86. During the course of this scan however the probe 80 is angled by means of a tilt stage (not shown in this figure) attached to its carrier. The tilt is such that one side 98*a* of the probe is angled to vertical or over the vertical. This enables the tip 88 to trace the edge and edge-region of both the step 84 and trench 86 at one side. The size of the unscanned region 100 at the other side of each feature is accordingly increased.

A second scan (FIG. 6*b*) is then carried out with the probe 80 tilted in the opposite direction, again such that one side 98*b* is angled to vertical or over the vertical. The previously unscanned region 100 is accordingly scanned with the probe in this orientation, the blind spot now being at the other side 102.

The combination of data from both scans is apparent in FIG. 6c. Complete information regarding the surface features of the step 84 and trench 86 may be extracted.

In the embodiments described above, the relative angle between the probe and the sample is adjusted by tilting the probe only, leaving the sample stationary as the probe is tilted. In one alternative embodiment the relative angle between the probe and the sample is adjusted by tilting the sample only, leaving the probe stationary as the sample is tilted. In another alternative embodiment the relative angle between the probe and the sample is adjusted by tilting the sample and the probe in opposite directions.

The invention claimed is:

1. A method of investigating a sample surface, the method comprising the steps of: (a) bringing a probe into close proximity with a first sample; (b) Scanning the probe across the first sample; (c) monitoring a response of the probe to its interaction with the sample using a detection system and colleting a first data set indicative of said response; (d) tilting the probe through a tilt angle with respect to the first sample; (e) scanning the tilted probe across the first sample or across a second sample; and (f) monitoring a response of the tilted probe to its interaction with the scanned sample using a detection system and collecting a second data set indicative of said response, wherein the method includes the additional step of analysing the first data set prior to tilting the probe in order to determine the tilt angle, and wherein the step of analysing the first data set comprises the steps of: searching the first data set and identifying asymmetric features therein; and determining the degree of asymmetry in the asymmetric features in order to provide an estimate of the tilt angle.

2. A method according to claim 1 wherein a map of the sample surface is generated using the second data set.

3. A method according to claim 1 wherein the first sample is a calibration sample and the second sample is scanned at step (e).

4. A method according to claim 1 including the additional steps of: (g) Analysing the second data set by searching for asymmetric features and, if present, determining a second tilt angle in accordance with the degree of asymmetry; (h) tilting the probe through the second tilt angle with respect to the sample; (i) Optionally changing the sample to a third sample; (j) scanning the further-tilted probe across the first, second or third sample; and (k) monitoring a response of the further-tilted probe to its interaction with the sample using a detection system and collecting a third data set indicative of said response.

5. A method according to claim 4 wherein a map of the sample surface is generated using the third data set.

6. A method of investigating a sample surface according to claim 1 wherein the first sample is scanned at both steps (b) and (e), the probe being oriented at a first angle with respect to the sample as it scans at step (b) and at a complementary angle as it scans at step (e), the scans covering at least partly coincident areas of the sample such that the first and second data sets can be combined to enable generation of a third data set relevant to the coincident area.

7. A method according to claim 6 wherein the second angle has the same magnitude as the first angle in an opposite direction.

8. A method according to claim 1 wherein, following the step of tilting the probe is aligned with the detection system.

9. A method according to claim 1 wherein the step of tilting the probe comprises driving an actuator to apply a force to one side of a platform such that the platform pivots about a pivot point, the orientation of the platform being linked to that of the probe.

10. A method according to claim 1 wherein the probe is supported by a carrier, the probe is scanned by driving the carrier with a scanner; and the probe is tilted by tilting the carrier and the scanner.

11. A scanning probe microscope that is operable in accordance with the method of claim 1.

12. A microscope according to claim 11 wherein the microscope includes a high aspect ratio probe, this probe being used to investigate the sample surface.

* * * * *